United States Patent
Blendermann et al.

(10) Patent No.: US 7,167,326 B1
(45) Date of Patent: Jan. 23, 2007

(54) TAPE DRIVE THAT SUPPORTS UPDATE-IN-PLACE

(75) Inventors: Stephen H. Blendermann, Boulder, CO (US); Thomas J. Murray, Longmont, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 11/026,079

(22) Filed: Dec. 30, 2004

(51) Int. Cl.
*G11B 27/02* (2006.01)

(52) U.S. Cl. ........................... 360/13; 360/72.2

(58) Field of Classification Search .......... 360/72.2, 360/13, 78, 48, 72.1, 78.02, 73.08, 74.4, 360/31, 40, 46
See application file for complete search history.

(56) References Cited

U.S. PATENT DOCUMENTS

| | | | |
|---|---|---|---|
| 4,549,234 A * | 10/1985 | Sakamoto | 386/78 |
| 5,485,321 A * | 1/1996 | Leonhardt et al. | 360/48 |
| 5,710,676 A * | 1/1998 | Fry et al. | 360/72.1 |
| 5,793,552 A * | 8/1998 | Howell | 360/72.2 |
| 5,892,633 A * | 4/1999 | Ayres et al. | 360/73.08 |
| 5,923,494 A * | 7/1999 | Arisaka et al. | 360/78.02 |
| 5,959,800 A * | 9/1999 | Hartung et al. | 360/74.4 |
| 5,995,306 A * | 11/1999 | Contreras et al. | 360/31 |
| 6,031,671 A * | 2/2000 | Ayres | 360/40 |
| 6,094,605 A | 7/2000 | Blendermann et al. | 700/214 |
| 6,226,441 B1 * | 5/2001 | Hartung et al. | 386/46 |
| 6,674,599 B1 * | 1/2004 | Rae et al. | 360/72.1 |
| 6,937,411 B2 * | 8/2005 | Goodman et al. | 360/48 |

* cited by examiner

*Primary Examiner*—Fred F. Tzeng
(74) *Attorney, Agent, or Firm*—Brooks Kushman PC

(57) ABSTRACT

A method in a data processing system is disclosed for permitting update-in-place in a tape drive. Data in a particular record in a tape that is mounted on the tape drive is modified. The particular record is located in a particular one of multiple different tracks in the tape. A first end-of-data mark is written after the modified data. Data in the particular one of the different tracks that is located after the first end-of-data mark is invalidated. All remaining data in all others of the tracks remain valid after the first end-of-data mark is written.

16 Claims, 6 Drawing Sheets

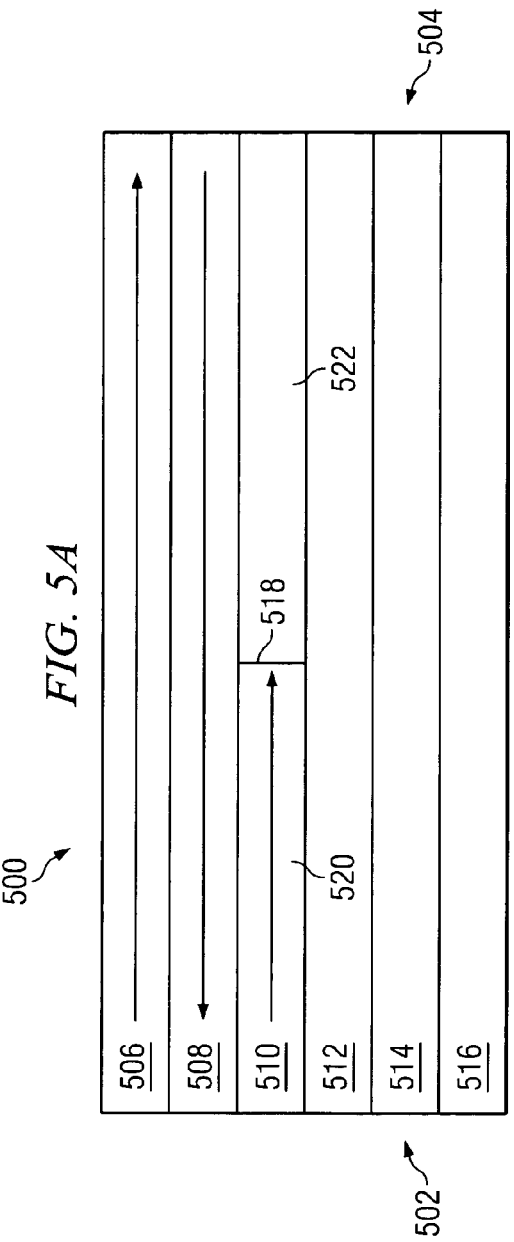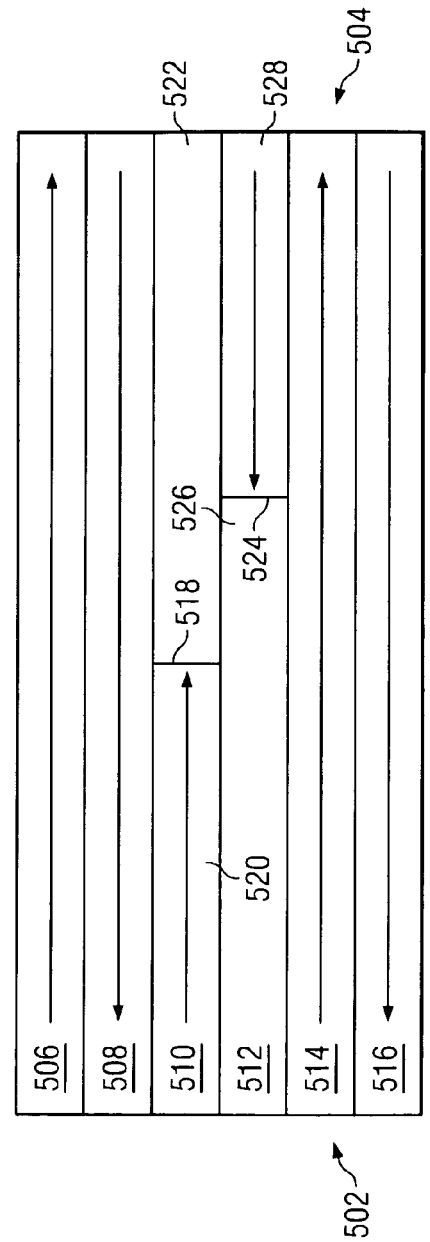

TAPE DRIVE THAT SUPPORTS UPDATE-IN-PLACE

CROSS-REFERENCE TO RELATED APPLICATION

The subject matter of the present invention is related to co-pending U.S. patent application Ser. No. 11/026,076, entitled: "Translation Device Driver for Translating Between Disk Device Driver and Tape Device Driver Commands", filed on even date herewith, assigned to the same assignee hereof, and which is incorporated herein by reference.

BACKGROUND OF THE INVENTION

1. Technical Field

The present invention relates generally to data processing systems and more particularly to storage devices and storage systems. Still more specifically, the present invention provides a method and apparatus for providing a tape drive that supports update-in-place.

2. Description of Related Art

Tapes store data sequentially from the beginning of the tape to the end of the tape. A computer system cannot modify data stored in the middle of the data stored on the tape. A tape drive is an append-only storage system. Thus, data can be appended to the end of the data currently stored on the tape. Data stored in the middle of the data on a tape can be modified, but in this case, all of the data stored after the modified data on the entire tape will be invalidated. Therefore, data cannot be modified in the middle of the tape and have the data located after the modified data remain usable. When data is replaced in the middle of the tape, all data located on all tracks on the entire tape after the replaced data is invalidated.

While tape storage is directly, i.e. randomly, accessible for reading and writing, there are no tape storage devices that support an update-in-place capability. That is, an attempt to read a virtual or physical tape record location beyond the updated or rewritten record is not permitted because the data located after the updated or rewritten record is invalid after the update.

FIG. 1 is a block diagram of a data processing system 100 that includes a tape application 102 that accesses a tape drive 104 through a tape driver 106 in accordance with the prior art.

Tape application 102 issues requests to access tape drive 104 first to tape driver 106 which then forwards the requests to tape drive 104. Data is stored in records on tape media 108 that is included within tape drive 104. When a particular record is to be accessed, tape media 108 must first be physically positioned to that record. When a record is to be read, tape media 108 is wound and rewound until that record is reached on tape media 108. The data can then be read from the record and transmitted from tape drive 104 back to tape driver 106.

Additional data can be stored in tape drive 104 by appending additional records to the end of the data that is already stored on tape media 108. Existing data that is already stored on tape media 108 can also be modified. When existing data is to be modified, tape media 108 is wound and rewound until the record that includes that data is reached on tape media 108. The new data can then be written to that record. In this case, all of the data that is stored on all tracks of the tape after the modified record is invalidated.

For example, FIG. 1 illustrates reading a record, such as record 54, from tape media 108. When a record, such as record 54, is read, the data on tape media 108 is not affected. It remains valid. When a record, such as new record 58 is appended to the end of the existing records, the existing records are not affected. They remain valid. If, however, an existing record, such as record 55, is modified, the remaining records that are located after the modified record are invalidated. In this case, if record 55 is modified, records 56–58 are invalidated.

Therefore, a need exists for a method and apparatus for providing a tape drive that supports update-in-place.

SUMMARY OF THE INVENTION

A method in a data processing system is disclosed for permitting update-in-place in a tape drive. Data in a particular record in a tape that is mounted in the tape drive is modified. The particular record is located on a particular one of multiple different tracks in the tape. A first end-of-data mark is written after the modified data. Data in the particular one of the different tracks that is located after the first end-of-data mark is invalidated. All remaining data in all others of the tracks remain valid after the first end-of-data mark is written.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5A is a block diagram of a tape media that includes an end-of-data mark that invalidates only the data in a track that is stored after data that was modified in the track in accordance with the present invention;

FIG. 5B is a block diagram of a tape media that includes an end-of-data mark in two tracks where each end-of-data mark invalidates only the data in the track that is stored after data that was modified in the track in accordance with the present invention;

DETAILED DESCRIPTION OF THE PREFERRED EMBODIMENTS

A preferred embodiment of the present invention and its advantages are better understood by referring to the figures, like numerals being used for like and corresponding parts of the accompanying figures.

The present invention permits update-in-place in a physical or virtual tape drive. Each track in the tape may be modified without affecting the other tracks in the tape and without invalidating data that is stored in the other tracks.

A "track" is defined herein as a single track or a group of tracks that are utilized as a single unit. For a virtual tape drive, each addressable block would be considered to be a "track". In addition, a "track" as used herein is not restricted to the size of a physical track on a physical tape.

The present invention permits the storage of one end-of-data mark in each track in a tape. Data that is located before an end-of-data mark in a particular track remains valid after the end-of-data mark is written while the data that is located after the end-of-data mark in that particular track is invalidated. Data, and any other end-of-data marks, in other tracks in the tape are not affected by the writing of an end-of-data mark in this particular track.

Figure 1:
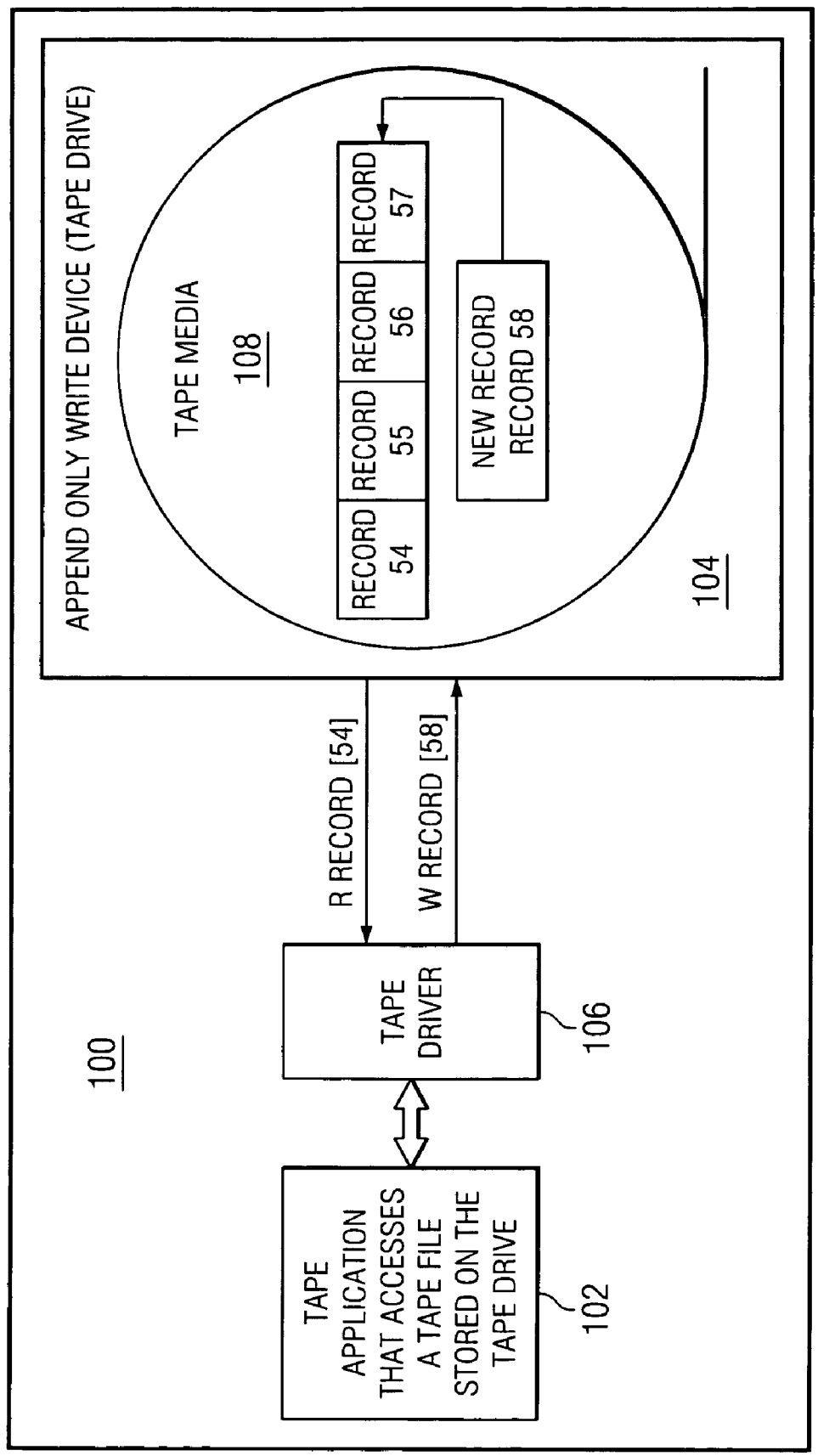
FIG. 1 is a block diagram of a data processing system that includes a tape application that accesses a tape drive through a tape driver in accordance with the prior art.
Figure 2:
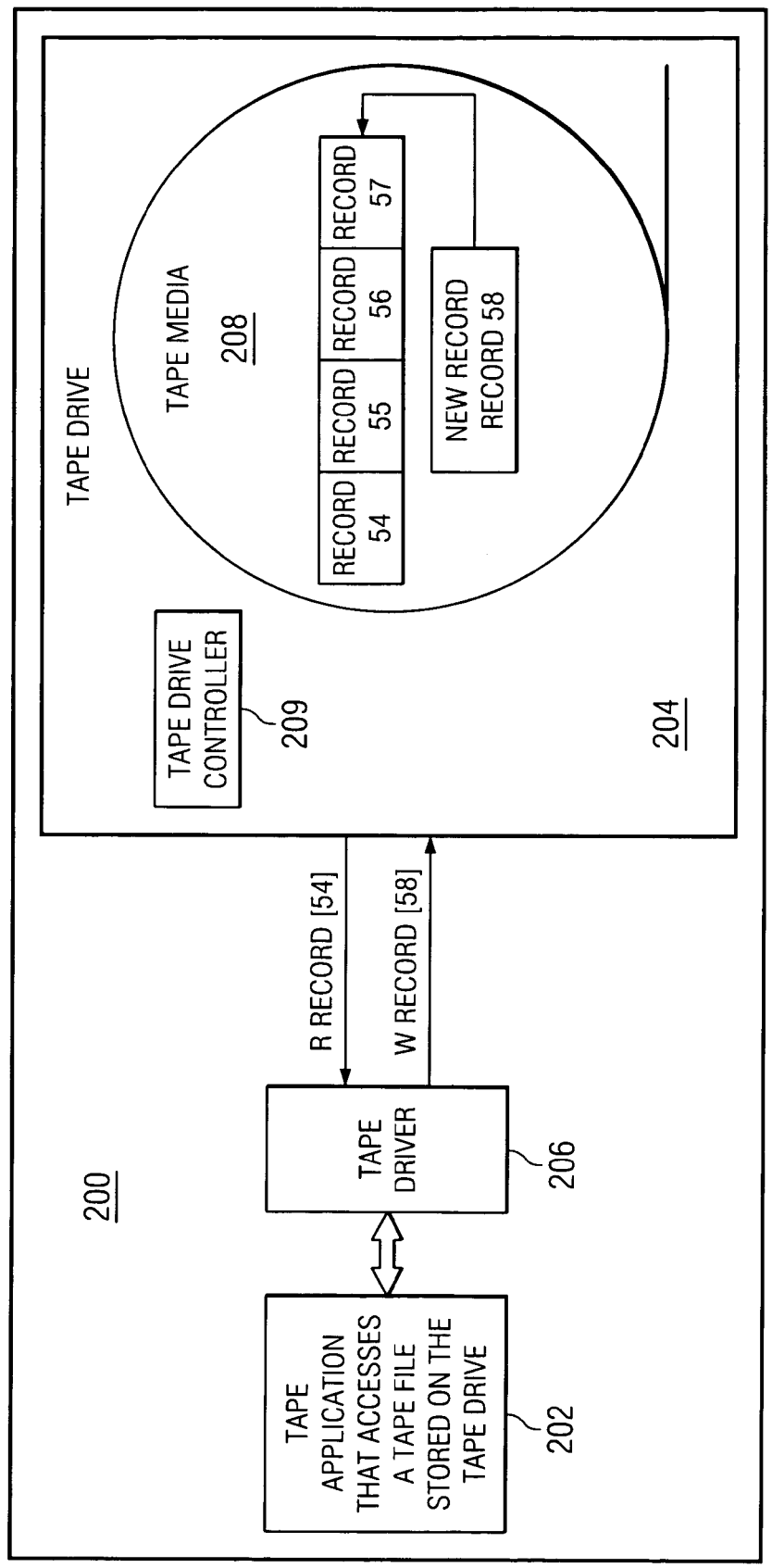
FIG. 2 is a block diagram of a data processing system that includes a tape application that accesses a tape drive that implements the present invention in accordance with the present invention.

FIG. 2 is a block diagram of a data processing system 200 that includes a tape application 202 that accesses a tape drive 204 through a tape driver 206 in accordance with the present invention. Tape drive 204 permits update-in-place modification to its data.

Tape application 202 issues requests to access tape drive 204 first to tape driver 206 which then forwards the requests to tape drive 204. Data is stored in records on tape media 208 that is included within tape drive 204. Tape drive 204 includes a tape drive controller 209 that processes requests to access tape media 208. Controller 209 is responsible for managing the media information region that is described below.

Figure 3:
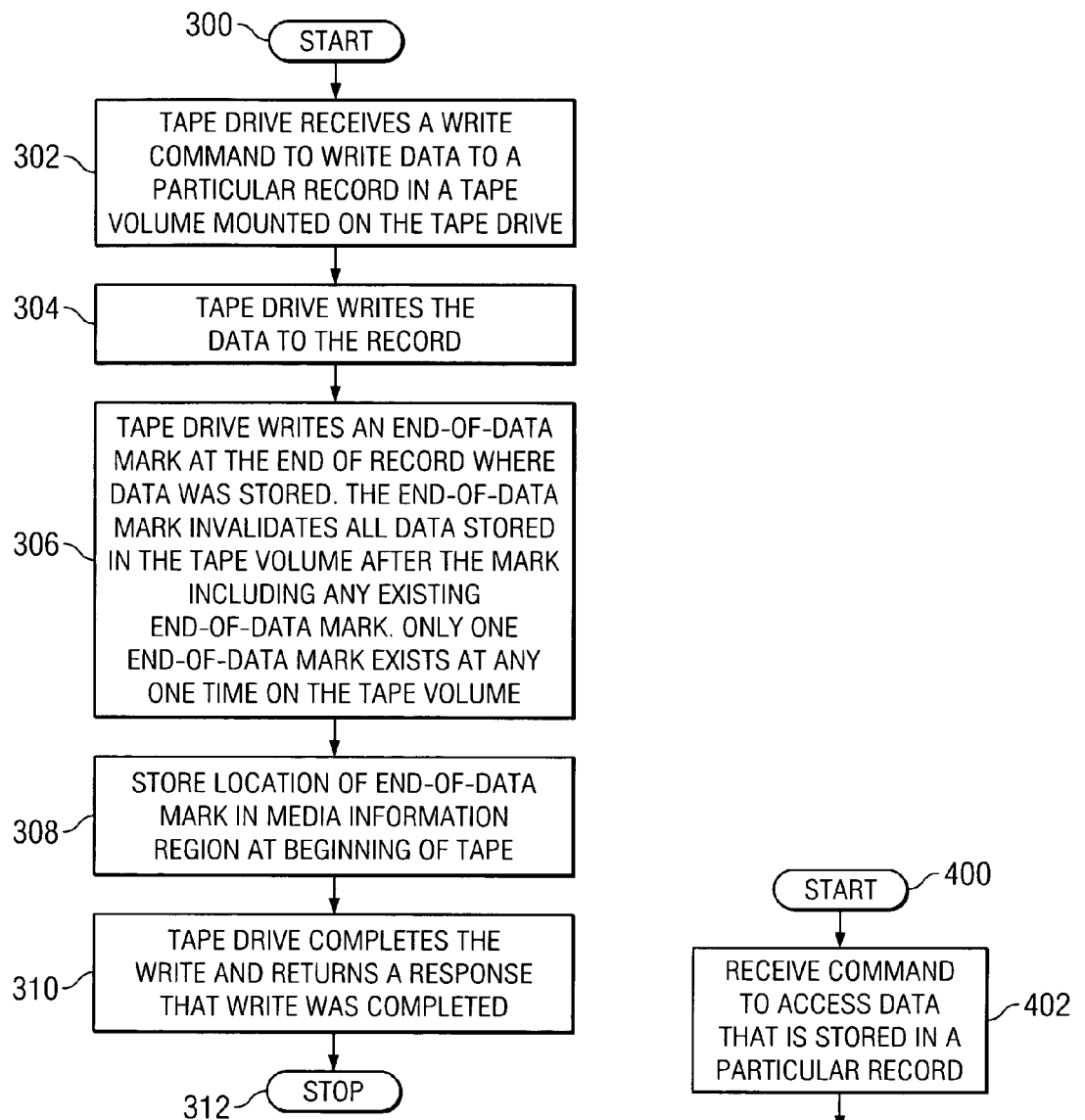
FIG. 3 depicts a high level flow chart that illustrates a tape drive that does not support update-in-place and that invalidates all data stored after modified data in accordance with the prior art.

FIG. 3 illustrates a high level flow chart that depicts modifying data in a tape drive that does not support update-in-place in accordance with the prior art. The process starts as depicted by block 300 and thereafter passes to block 302 which illustrates a tape drive receiving a WRITE command to write to a particular record in the tape volume mounted on the tape drive. Next, block 304 depicts the tape drive writing the data to the record.

The process then passes to block 306 which illustrates the tape drive writing an end-of-data mark at the end of the record where the data was stored. The end-of-data mark invalidates all data that is stored in the tape volume after the end-of-data mark. This end-of-data mark also invalidates any end-of-data mark that may already be stored after the new end-of-data mark. In this manner, only one end-of-data mark can exist at any one time in a prior art tape drive.

Block 308, then, depicts storing the location of the end-of-data mark in the media information region which is located at the beginning of the tape. The media information region includes information about where each record is physically stored on the tape media. Thus, the media information region can be used to determine in which track a particular record is located. In addition, information about the location of the end-of-data mark is stored in the media information region.

Next, block 310 illustrates the tape drive completing the write command and returning a response that the write was completed. The process then terminates as illustrated by block 312.

Figure 4:
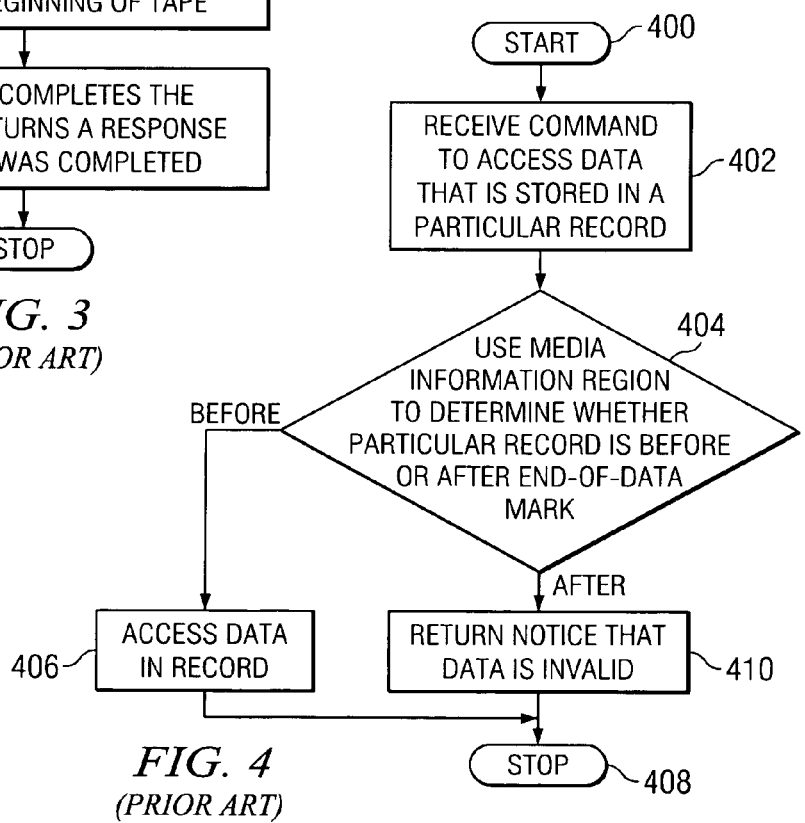
FIG. 4 illustrates a high level flow chart that depicts accessing a particular record in a tape drive that does not support update-in-place in accordance with the prior art.

FIG. 4 illustrates a high level flow chart that depicts accessing a particular record in a tape drive that does not support update-in-place in accordance with the prior art. The process starts as depicted by block 400 and thereafter passes to block 402 which illustrates the tape drive controller receiving a command to access data that is stored in a particular record. Next, block 404 depicts a determination of whether the particular record is located before or after the end-of-data mark. This determination is made by using the information stored in the media information region.

If a determination is made that the particular record is located before the end-of-data mark, the process passes to block 406 which illustrates accessing the data in the record. The process then terminates as depicted by block 408. Referring again to block 404, if a determination is made that the particular record is located after the end-of-data mark, the process passes to block 410 which illustrates returning a notice that the requested data is invalid. The process then terminates as depicted by block 408.

FIG. 5A is a block diagram of a tape media 500 that includes an end-of-data mark 518 that invalidates only the data in a track that is stored after data that was modified in the track in accordance with the present invention. One end-of-data mark is stored in tape media 500. Tape media 500 is typically a tape capable of being mounted on a tape drive. Tape 500 has a first end 502 and a second end 504. These ends may be physical ends or logical ends (as is the case with a tape device that supports mid-point load).

Tape 500 includes multiple different tracks. Tape 500 includes tracks 506, 508, 510, 512, 514, and 516. Each track may be a single track or a group of tracks. As used herein, the term "track" can mean a single track or a group of multiple tracks that are treated together as if the group were a single entity. Each track, or group of tracks, in the tape serves as if each track or group of tracks were a separate independent tape.

Data is written to tape 500 in multiple passes of the tape. For example, during the first pass of the tape, data is written to track 506 from first end 502 of tape 500 to second end 504 of tape. During the second pass of the tape, data is written to track 508 from second end 504 of tape 500 to first end 502 of tape. During the third pass of the tape, data is written to track 510 from first end 502 to second end 504. During the fourth pass of the tape, data is written to track 512 from second end 504 to first end 502. During the fifth pass of the tape, data is written to track 514 from first end 502 to second end 504.

As an example, data has been modified in a particular record in section 520 in track 510. After the data was written, end-of-data mark 518 was written at the end of the modified record. Data that is located after the end-of-data mark 518 and before second end 504 is invalidated. All other data in other tracks is not invalidated by end-of-data mark 518. Thus, data in tracks 506 and 508 remains valid after end-of-data mark 518 is stored. Data that is stored in section 520 which is before end-of-data mark 518 in track 510 is valid after end-of-data mark 518 is written. Data that is stored after end-of-data mark 518, in section 522, in track 510 is invalid after end-of-data mark 518 is written. After end-of-data mark 518 is written, data in tracks 512, 514, and 516 remains valid.

FIG. 5B is a block diagram of a tape media that includes an end-of-data mark in two tracks where each end-of-data mark invalidates only the data in the track that is stored after data that was modified in the track in accordance with the present invention. FIG. 5B depicts the tape media 500 of FIG. 5A at a later time after additional data has been modified in a record in track 512.

Additional data has been modified that is stored in a second particular record in section 528 in track 512. After the data in the second record was modified, end-of-data mark 524 was written at the end of the second record. Data that is located after the end-of-data mark 524 that is located in track 512 is invalidated. All other data in other tracks is not invalidated by end-of-data mark 524. Thus, data in tracks 506, 508, and section 520 of track 510 remains valid after end-of-data mark 524 is stored. Data that is stored in section 528 before end-of-data mark 524 in track 512 is valid after end-of-data mark 524 is written. Data that is stored after end-of-data mark 524, in section 526, and before first end 502 in track 512 is invalid after end-of-data mark 524 is written. After end-of-data mark 524 is written, data in tracks 514 and 516 remains valid. In addition, writing end-of-data mark 524 does not affect end-of-data mark 518. The locations of end-of-data mark 518 and end-of-data mark 524 are stored in the media information region at the beginning of the tape.

Figure 6:
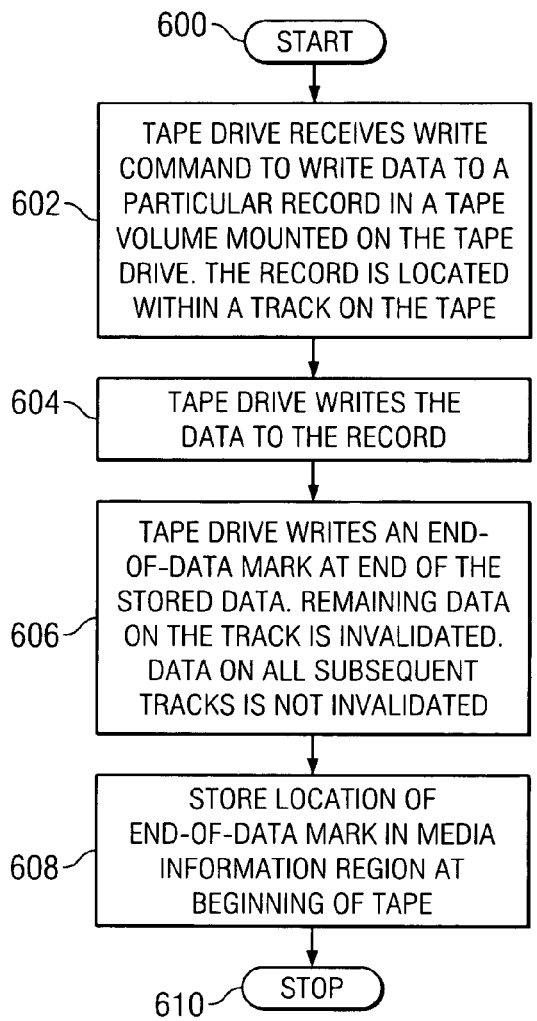
FIG. 6 depicts a high level flow chart that illustrates modifying data in a tape drive that supports update-in-place in accordance with the present invention.

FIG. 6 depicts a high level flow chart that illustrates modifying data in a tape drive that supports update-in-place in accordance with the present invention. The process starts as depicted by block 600 and thereafter passes to block 602 which illustrates the tape drive receiving a write command to write data to a particular record in a tape volume that is mounted on the tape drive. The record is located within a particular track on the tape. Next, block 604 depicts the tape drive writing the data to the record.

The process then passes to block 606 which illustrates the tape drive writing an end-of-data mark at the end of the data that was stored in the particular record in the track. The remaining data on that track that is located after the end-of-data mark is invalidated by the end-of-data mark. The data that is located on all other tracks on the tape is not invalidated. The new end-of-data mark invalidates any existing end-of-data mark in this particular track. The new end-of-data mark does not invalidate any existing end-of-data mark in any other track. Thus, multiple end-of-data marks can simultaneously coexist in the tape media. Only one end-of-data mark can exist at one time within a single track. A new end-of-data mark will only affect another existing end-of-data mark within the same track as the new end-of-data mark.

Block 608, then, depicts the tape controller storing the location of this end-of-data mark in the media information region at the beginning of the tape. The process then terminates as illustrated by block 610.

Figure 7:
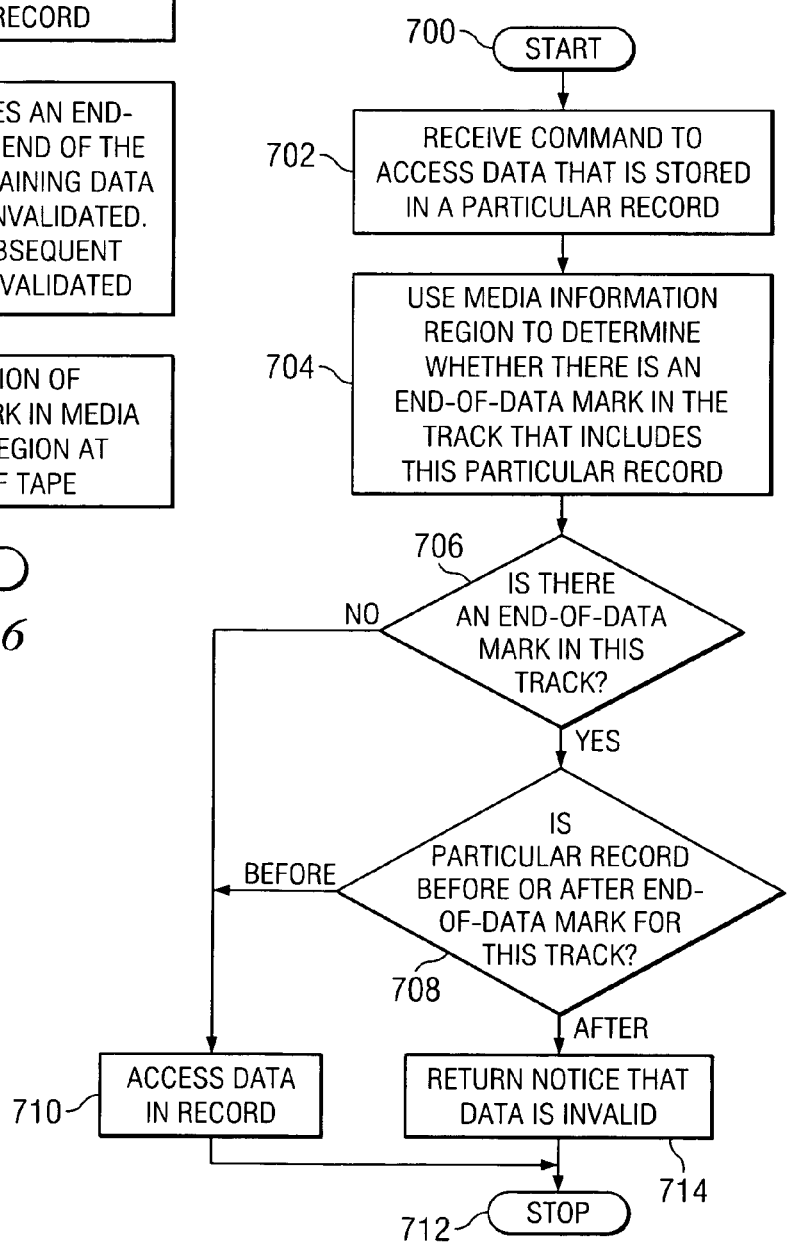
FIG. 7 illustrates a high level flow chart that depicts accessing a particular record in a tape drive that supports update-in-place in accordance with the present invention.

FIG. 7 illustrates a high level flow chart that depicts accessing a particular record in a tape drive that supports update-in-place in accordance with the present invention. The process starts as depicted by block 700 and thereafter passes to block 702 which illustrates a tape drive controller receiving a command to access data that is stored in a particular record. Next, block 704 depicts using the media information region to determine whether there is an end-of-data mark in the track that includes this particular record.

Block 706, then, illustrates a determination of whether or not there is an end-of-data mark in this particular track. If a determination is made that there is no end-of-data mark in this particular track, the process passes to block 710. Referring again to block 706, if a determination is made that there is an end-of-data mark in this particular track, the process passes to block 708 which depicts a determination of whether or not this particular record is before or after the end-of-data mark already stored in this track. If a determination is made that this particular record is before the end-of-data mark already stored in this track, the process passes to block 710 which illustrates accessing the data in the record. Referring again to block 708, if a determination is made that this particular record is after the end-of-data mark already stored in this track, the process passes to block 714 which illustrates returning a notice that the data is invalid. The process then terminates as depicted by block 712.

Figure 8:
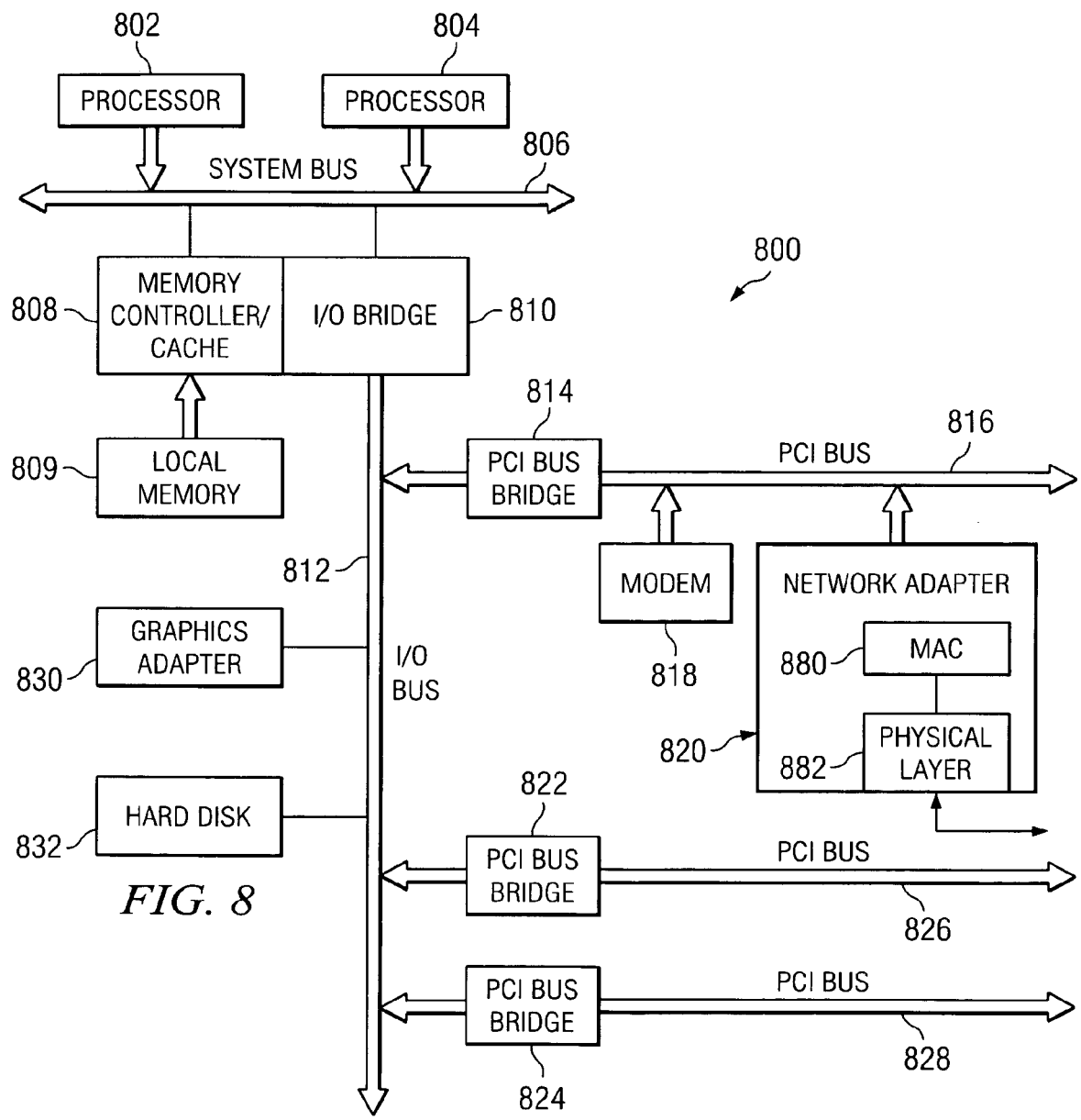
FIG. 8 is a block diagram of a computer system that may include the present invention in accordance with the present invention.

FIG. 8 is a block diagram of a data processing system that may include the present invention in accordance with the present invention. Data processing system 800 may be a symmetric multiprocessor (SMP) system including a plurality of processors 802 and 804 connected to system bus 806. Alternatively, a single processor system may be employed. Also connected to system bus 806 is memory controller/cache 808, which provides an interface to local memory 809. I/O bus bridge 810 is connected to system bus 806 and provides an interface to I/O bus 812. Memory controller/cache 808 and I/O bus bridge 810 may be integrated as depicted.

Peripheral component interconnect (PCI) bus bridge 814 connected to I/O bus 812 provides an interface to PCI local bus 816. A number of modems may be connected to PCI bus 816. Typical PCI bus implementations will support four PCI expansion slots or add-in connectors. Communications links to other network computers may be provided through modem 818 and network adapter 820 connected to PCI local bus 816 through add-in boards.

Additional PCI bus bridges 822 and 824 provide interfaces for additional PCI buses 826 and 828, from which additional modems or network adapters may be supported. In this manner, data processing system 800 allows connections to multiple network computers. A memory-mapped graphics adapter 830 and hard disk 832 may also be connected to I/O bus 812 as depicted, either directly or indirectly.

Those of ordinary skill in the art will appreciate that the hardware depicted in FIG. 8 may vary and could indeed be a mainframe architecture rather than the depicted architecture. In addition, other peripheral devices, such as optical disk drives and the like, also may be used in addition to or in place of the hardware depicted. The depicted example is not meant to imply architectural limitations with respect to the present invention.

It is important to note that the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for permitting update-in-place in a tape that is mounted on a tape drive, said tape including a plurality of tracks, said method comprising:
   receiving a command to modify data in a particular record in said tape, said particular record being located in one of said plurality of different tracks;
   permitting update-in-place modification by permitting modification of said one of said plurality of different tracks by modifying said record without invalidating data that is stored in others of said plurality of tracks;
   maintaining multiple different end-of-data marks for respective tracks in said tape concurrently;
   maintaining the location of a respective most current end-of-data mark in a media information region at the beginning of said tape for each of said plurality of tracks that contains an end-of-data mark; and
   determining whether data in said tape is valid or invalid by locating each respective most current end-of-data mark that is stored in said tape, wherein on a first track, data stored at a location after a respective most current end-of-data mark is invalid.

2. The method according to claim 1, further comprising:
   utilizing said media information region to locate each end-of-data mark.

3. The method according to claim 1, further comprising:
   writing a first end-of-data mark after said modified data;
   invalidating data in said one of said plurality of different tracks that is located after said first end-of-data mark; and
   all remaining data in all others of said plurality of different tracks remaining valid after said first end-of-data mark is written.

4. The method according to claim 3, further comprising:
   modifying second data in a second particular record in said tape, said second particular record being located in a second one of said plurality of different tracks in said tape;
   writing a second end-of-data mark after said second modified data;
   invalidating data in said second one of said plurality of different tracks that is located after said second end-of-data mark;
   all remaining data in all others of said plurality of different tracks remaining valid after said second end-of-data mark is written; and
   said first end-of-data mark remaining valid after said second end-of-data mark was written.

5. The method according to claim 4, further comprising:
   receiving a command to access a second record;
   identifying one of said plurality of tracks in which said second record is located;
   determining whether a second end-of-data mark is stored in said identified one of said plurality of tracks;
   in response to determining that said second end-of-data mark is stored in said identified one of said plurality of tracks, determining whether said second record is located before or after said second end-of-data mark;
   in response to determining that said second record is located before said second end-of-data mark, accessing said second record; and
   in response to determining that said second record is located after said second end-of-data mark, returning a status that said second record does not exist.

6. The method according to claim 1, further comprising:
   said tape being a virtual tape; and
   said virtual tape being implemented using a physical disk drive, said physical disk drive including a plurality of separately addressable blocks.

7. The method according to claim 6, further comprising:
   each one of said plurality of tracks being one of said plurality of blocks in said virtual tape.

8. An apparatus in a data processing system for permitting update-in-place in a tape that is mounted on a tape drive, said tape including a plurality of tracks, said apparatus comprising:
   a command to modify data in a particular record in said tape, said particular record being located in one of said plurality of different tracks;
   said tape drive including a tape controller for permitting update-in-place modification by modifying said record without invalidating data that is stored in others of said plurality of tracks;
   a first end-of-data mark written after said modified data;
   data in said one of said plurality of different tracks that is located after said first end-of-data mark being invalidated; and
   all remaining data in all others of said plurality of different tracks being valid after said first end-of-data mark is written.

9. The apparatus according to claim 8, further comprising:
   said tape including multiple different end-of-data marks stored in multiple different tracks in said tape concurrently.

10. The apparatus according to claim 9, further comprising:
    for each of said plurality of tracks, a location for a most current end-of-data mark being stored in a media information region at the beginning of said tape.

11. The apparatus according to claim 10, further comprising:
    each most current end-of-data mark being utilized for determining whether data in a respective track of said tape is valid or invalid.

12. The apparatus according to claim 11, further comprising:
    said media information region being searched to locate each end-of-data mark.

13. The apparatus according to claim 8, further comprising:
    second data in a second particular record in said tape being modified, said second particular record being located in a second one of said plurality of different tracks in said tape;
    a second end-of-data mark being written after said second modified data;
    data in said second one of said plurality of different tracks that is located after said second end-of-data mark being invalidated;

all remaining data in all others of said plurality of different tracks being valid after said second end-of-data mark is written; and said first end-of-data mark being valid after said second end-of-data mark was written.

14. The apparatus according to claim 13, further comprising:

a command to access a second record;

one of said plurality of tracks being identified in which said second record is located;

said tape drive including a controller for determining whether a second end-of-data mark is stored in said identified one of said plurality of tracks;

in response to determining that said second end-of data mark is stored in said identified one of said plurality of tracks, said controller for determining whether said second record is located before or after said second end-of-data mark;

in response to determining that said second record is located before said second end-of-data mark, said controller for accessing said second record; and in response to determining that said second record is located after said second end-of-data mark, said controller for returning a status that said second record does not exist.

15. The apparatus according to claim 8, further comprising:

said tape drive being a physical tape drive.

16. The apparatus according to claim 8, further comprising:

said tape drive being a virtual tape drive;

said tape being a virtual tape;

said virtual tape being implemented using a physical disk drive, said physical disk drive including a plurality of separately addressable blocks; and each one of said plurality of tracks being one of said plurality of blocks in said virtual tape.

* * * * *